United States Patent [19]

Wank et al.

[11] Patent Number: 5,076,987
[45] Date of Patent: Dec. 31, 1991

[54] PROCESS FOR THE PRODUCTION OF OPTICALLY ISOTROPIC EXTRUSION FILMS

[75] Inventors: Joachim Wank, Dormagen; Hans L. Weber, Rommerskirchen; Claus Burkhardt, Krefeld; Dieter Freitag, Krefeld; Bernhard Schulte, Krefeld; Werner Waldenrath, Cologne, all of Fed. Rep. of Germany

[73] Assignee: Bayer Aktiengesellschaft, Leverkusen Bayerwerk, Fed. Rep. of Germany

[21] Appl. No.: 504,482

[22] Filed: Apr. 4, 1990

[30] Foreign Application Priority Data

Apr. 7, 1989 [DE] Fed. Rep. of Germany ....... 3911218

[51] Int. Cl.$^5$ .............................................. B29C 47/90
[52] U.S. Cl. ................................ 264/210.2; 264/210.5; 264/280; 425/325
[58] Field of Search ...................... 264/280, 341, 210.2, 264/175, 210.5; 425/385, 325, 371, 363

[56] References Cited

U.S. PATENT DOCUMENTS

| 3,901,639 | 8/1975 | Mandelson et al. | 425/385 |
| 4,376,751 | 3/1983 | Duchane | 264/341 |
| 4,614,634 | 9/1986 | Weber et al. | 264/341 |
| 4,696,779 | 9/1987 | Wideman | 425/325 |
| 4,844,766 | 7/1989 | Held | 425/371 |
| 4,859,392 | 8/1989 | Vetter | 425/363 |
| 4,925,379 | 5/1990 | Bourelier | 425/363 |
| 4,929,474 | 5/1990 | Avni et al. | 264/280 |

FOREIGN PATENT DOCUMENTS 294705 12/1988 European Pat. Off. .

Primary Examiner—Jeffery Thurlow
Attorney, Agent, or Firm—Joseph C. Gil; Aron Preis

[57] ABSTRACT

A process for the production of optically isotropic extrusion films is disclosed. Accordingly in a first process step a thermoplsatic resin is extruded to form a film having a thickness below 600 μm. The second process step entails a) calendering said film between a ground elastic roller and a high gloss steel roller to produce a film having a high gloss surface and a matt surface, or b) calendering said film between a lacquered elastic roller and a high gloss steel roller to produce a film having high gloss on both surfaces, or c) calendering said film between a ground elastic roller and a high gloss steel roller to produce a film having a high gloss surface and a matt surface, and then coating said matt surface with a melt of said thermoplastic polymer and calendering the resulting coated film between a high gloss steel roller and a ground elastic roller, with the high gloss side of the coated film facing the roller of elastic material.

3 Claims, No Drawings

PROCESS FOR THE PRODUCTION OF OPTICALLY ISOTROPIC EXTRUSION FILMS

This invention relates to a process for the production of optically isotropic extrusion films having a thickness below 600 μm, preferably from 500 μm to 50 μm, from thermoplastic polymers, characterised in that either a) an optically isotropic film which has a high gloss on one side and is matt on the other side is produced from the thermoplastic polymer by extrusion followed by calendering between a ground elastic roller and a high gloss steel roller or b) a film which is optically isotropic but has a high gloss on both sides is produced from the thermoplastic polymer by extrusion followed by calendering between a lacquered elastic roller and a high gloss steel roller or c) the film produced by process variation a) is coated with a melt of the same thermoplastic polymer on the matted side of the film and the coated film thus obtained is again calendered between a high gloss steel roller and a ground elastic roller with the high gloss side of the coated film facing the roller of elastic material.

The present invention also relates to optically isotropic extrusion films obtainable by the process according to the invention.

Extrusion and subsequent calendering between a ground elastic roller and a high gloss steel roller are carried out at temperatures in the range of from 150° C. to 400° C., preferably from 280° C. to 320° C., and at pressures from 50 bar to 200 bar, preferably from 80 bar to 150 bar.

The following are examples of suitable thermoplastic polymers: thermoplastic, aromatic polycarbonates, thermoplastic, aromatic polyester carbonates, thermoplastic polyaryl sulphones, thermoplastic cellulose esters, thermoplastic polymethyl methacrylates, thermoplastic polystyrenes, thermoplastic styrene/acrylonitrile copolymers and thermoplastic styrene/ maleic acid anhydride copolymers. The thermoplastic polymers suitable for the present invention are known.

Thermoplastic polycarbonates based on bis-(hydroxyphenyl)alkanes and/or -cycloalkanes are preferred thermoplastic polymers; for example, the polycarbonates based on 2,2-bis(4-hydroxyphenyl)-propane (bisphenol A). Thermoplastic polymer films which are free from double refraction are known. They are required, for example, for the production of liquid crystal displays (see U.S. Pat. No. 4,614,634 (LeA 22 595-US)).

The only method at present available in practice for producing such films of thermoplastic polymers consists of starting with cast or extruded films having an anisotropy above 100 nm, measured as path difference between the individual optical wave fronts, and tempering these films by a very expensive after-treatment or swelling them by means of organic solvents.

There has therefore been no lack of attempts to develop suitable processes for producing tension free films of thermoplastic polymers. In most cases, these attempts were based on the principle of removing the tension by a process carried out immediately after production of the films.

The obvious solution of obtaining such thin films by extrusion followed by calendering through two steel rollers does not result in freedom from birefringence if the films are less than about 600 μm in thickness.

It was surprisingly found that optically isotropic extrusion films less than 600 μm in thickness may be obtained by producing the films by extrusion followed by calendering between a ground elastic roller and a high gloss steel roller at temperatures from 150° C. to 400° C., preferably from 280° C. to 320° C., and at pressures from 50 bar to 200 bar, preferably from 80 bar to 150 bar.

The optically isotropic extrusion films obtainable by this variation of the process according to the invention have a smooth surface and a rough surface.

For certain purposes, however, such films free from double refraction are required to have two smooth surfaces.

The obvious idea of replacing the ground elastic roller by a polished steel roller for producing two smooth surfaces does not lead to the desired result. Films produced by this method have a high and nonuniform double refraction. This shows that the degree of double refraction of the film can only be controlled by using a combination of steel roller with elastic roller although the rough surface can be avoided by coating the elastic roller with a high gloss lacquer.

The present invention therefore also relates to variation b) of the process according to the invention for the production of optically isotropic extrusion films having a thickness below 600 μm and two smooth surfaces, characterised in that the process according to the invention is carried out using a ground elastic roller which is coated with a high gloss lacquer.

Lacquers suitable for this purpose are, for example, those which are capable of following the elastic deformation of the surface to which they are applied and neither tend to stick to the hot polymer melt with which they are in contact nor suffer damage due to the high temperature of the polymer melt. Lacquers based on polysiloxanes, for example, are suitable for this purpose.

Although such systems provide satisfactory results in the production of optically isotropic extrusion films which are less than 600 μm in thickness and have two smooth surfaces, there has been no lack of attempts to find other methods of producing the films according to the invention in view of the delicate nature of the lacquered elastic rollers.

It has surprisingly been found that films free from double refraction and having two smooth surfaces are obtained when a film which is glossy on one side and matt on the other side is first produced by extrusion followed by calendering between a high gloss steel roller and a ground elastic roller at temperatures from 150° C. to 400° C., preferably from 280° C. to 320° C., and at pressures from 50 bar to 200 bar, preferably from 80 bar to 150 bar, and this film is then again run through the above mentioned calender of high gloss steel roller and ground elastic roller but with the glossy side of the film facing the ground elastic roller while the polymer melt extruded from the extrusion die is calendered between the polished steel roller and the polymer film running into it. A film which is glossy on both sides and free from double refraction is obtained as a result of the melting and welding processes produced by the high temperature of the polymer melt.

This invention thus also relates to process variation c) of the process according to the invention for the production of optically isotropic extrusion films having a thickness below 600 μm and a smooth surface on both sides, characterised in that a film which is glossy on one side and matt on the other is produced by extrusion followed by calendering between a high gloss steel roller and a ground elastic roller at temperatures from 150° C. to 400° C., preferably from 280° C. to 320° C., and at pressures from 50 bar to 200 bar, preferably from 80 bar to 150 bar, and this film is then again introduced into this calender of high gloss steel roller and ground roller but with the glossy side of the film facing the ground elastic roller while the polymer melt extruded from the extrusion die is calendered between the polished steel roller and the incoming polymer film.

The optically isotropic extrusion films obtainable by the process according to the invention may be used, for example, for liquid crystal displays or for covering optical data stores.

EXAMPLES

1. A polycarbonate melt of bisphenol-A homopolycarbonate having a relative viscosity of 1.32 (determined on a 0.5% solution in $CH_2Cl_2$) is extruded through a broad sheeting die at a melting temperature of 290° C. and a melting pressure of 135 bar and calendered in a rolling mill consisting of a high gloss steel roller and a matted rubber roller of shore A hardness 70. A polycarbonate film 450 μm in thickness which has a high gloss on one side and is matt on the other is obtained by this procedure. A path difference of 15 nm/mm is measured parallel to the normal to the surface of the film in the polarisation microscope.

2. A bisphenol-A homopolycarbonate having a relative viscosity of 1.34 (determined on a 0.5% solution in $CH_2Cl_2$) is melted at 300° C. in an extruder and the melt is extruded through a broad sheeting die. The fan of melt leaving the die is drawn off between a steel roller polished to a high gloss and a ground roller of silicone rubber having a shore A hardness of 70, and a film 100 μm in thickness is obtained.

The temperature of the steel roller is 130° C. and the surface temperature of the silicone rubber roller is about 120° C. The contact pressure between the silicone rubber roller and the steel roller, measured as linear pressure, is 1 kp/cm.

The film is rolled up after its passage through several cooling rollers. The film, which has a glossy surface on one side and a matt surface on the other side, has a path difference of less than 10 nm/mm.

The film thus produced is coated with the melt of the above polycarbonate, which has a relative viscosity of 1.34 (determined on a 0.5% solution in methylene chloride), by running the above described isotropic film into the nip between the ground silicone rubber roller and the steel roller with the high gloss side of the film facing the silicone rubber roller while the melt is applied to the matted side.

The film coated as described above has a total thickness of 300 μm. The film has a glossy surface on both sides, the transmission is 91% and the path difference is <10 nm/mm.

We claim:

1. A process for the production of optically isotropic extruded films having gloss on both sides and a thickness below 600 μm from a thermoplastic polymer, characterized in that either
   a) a film which is optically isotropic and has a high gloss on both sides is produced from the thermoplastic polymer by extrusion followed by calendering between a lacquered elastic roller and a high gloss steel roller, or
   b) an optically isotropic film which has a high gloss on one side and is matt on the other side is produced from the thermoplastic polymer by extrusion followed by calendering between a ground elastic roller and a high gloss steel roller and in a subsequent step is coated with the melt of the same thermoplastic polymer on the matted side of the film and the resulting coated film is again calendered between a high gloss steel roller and a ground elastic roller, with the high gloss side of the coated film facing the roller of the elastic material, said extrusion and calendering being carried out at a temperature of from 150 to 400° C. and at a pressure of from 50 to 200 bar, said thermoplastic polymer being at least one member selected from the group consisting of a polycarbonate based on bis(-hydroxphenyl)-alkane and a polycarbonate based on a bis(-hydroxyphenyl)-cycloalkane.

2. Process according to claim 1 for the production of optically isotropic extrusion films having a thickness of from 500 μm to 50 μm.

3. The process of claim 1 wherein said temperature is from 280° to 320° C. and said pressure is 80 to 150 bar.

* * * * *